United States Patent
Downs Mullen (10) Patent No.: US 8,736,464 B1
(45) Date of Patent: May 27, 2014

(54) SYSTEM AND METHOD FOR PRESENTING A DYNAMIC CHECKLIST TO THE USER OF A VEHICLE

(75) Inventor: Timothy S. Downs Mullen, Atkins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 868 days.

(21) Appl. No.: 12/874,642

(22) Filed: Sep. 2, 2010

(51) Int. Cl.
*G08B 19/00* (2006.01)
*G08B 21/00* (2006.01)
*G06F 3/048* (2013.01)
*G06F 7/00* (2006.01)
*G05D 3/00* (2006.01)

(52) U.S. Cl.
USPC ........... 340/945; 340/933; 340/521; 715/771; 715/810; 715/764; 715/852; 715/744; 705/305

(58) Field of Classification Search
USPC ......................................... 340/945, 933, 521
See application file for complete search history.

(56) References Cited

U.S. PATENT DOCUMENTS

| | | | | |
|---|---|---|---|---|
| 4,970,683 A | * | 11/1990 | Harshaw et al. | 715/841 |
| 5,454,074 A | * | 9/1995 | Hartel et al. | 715/710 |
| 5,522,026 A | * | 5/1996 | Records et al. | 715/710 |
| 6,262,720 B1 | * | 7/2001 | Jeffrey et al. | 715/710 |
| 6,633,801 B1 | * | 10/2003 | Durlacher et al. | 701/9 |
| 6,753,891 B1 | * | 6/2004 | Chohan et al. | 715/790 |

* cited by examiner

*Primary Examiner* — Fekadeselassie Girma
(74) *Attorney, Agent, or Firm* — Donna P. Suchy; Daniel M. Barbieri (57) ABSTRACT

A present novel and non-trivial system and method for presenting a dynamic checklist are disclosed. The system may be comprised of one or more vehicular sources of internal system data and a checklist generating processor, and a presentation unit such as a visual display unit. An automated response corresponding to each checklist item appearing on the dynamic checklist may be determined after real-time internal system data is received and applied to an acceptability configuration defined by a manufacturer and/or end-user. Then, a presentation data set representative of a dynamic vehicular checklist and comprised of each checklist item and its corresponding automated response could be generated and provided to a presentation unit which presents the dynamic checklist, whereby the user is presented with acceptability information of one or more of the checklist items. Additionally, the dynamic checklist may receive and present external data, and may provide for pilot interaction.

18 Claims, 6 Drawing Sheets

▶ WEIGHT AND BALANCE..................CHECKED
  (green)
• Check Zero Fuel Weight and Center of Gravity:
           PLANNED      ACTUAL
  ZFW      475,000      480,000 (green)
  CG       25.5%        26.0% (green)
           [ACCEPT]

FIG. 4A

▶ WEIGHT AND BALANCE..................CHECKED
  (amber)
• Check Zero Fuel Weight and Center of Gravity:
           PLANNED      ACTUAL
  ZFW      475,000      480,000 (green)
  CG       25.5%        26.2% (amber)
           [ACCEPT]

FIG. 4B

▶ WEIGHT AND BALANCE..................CHECKED
  (red)
• Check Zero Fuel Weight and Center of Gravity:
           PLANNED      ACTUAL
  ZFW      475,000      480,000 (green)
  CG       25.5%        26.3% (red)

FIG. 4C

▶ FUEL QUANTITY........................360,800 LBS
  (green)
• Check Fuel Distribution and Fuel Quantity
              PLANNED      ACTUAL
  LEFT O/B    15,000       15,100 (green)
  LEFT I/B    80,000       80,150 (green)
  CENTER      170,000      170,400 (green)
  RIGHT I/B   80,000       80,100 (green)
  RIGHT O/B   15,000       15,050 (green)
  TOTAL       360,000      360,800 (green)
              [ACCEPT]

FIG. 3A

▶ FUEL QUANTITY........................360,000 LBS
  (red)
• Check Fuel Distribution and Fuel Quantity
              PLANNED      ACTUAL
  LEFT O/B    15,000       12,000 (red)
  LEFT I/B    80,000       80,500 (green)
  CENTER      170,000      175,000 (red)
  RIGHT I/B   80,000       80,500 (green)
  RIGHT O/B   15,000       12,000 (red)
  TOTAL       360,000      360,000 (green)

FIG. 3B

```
▼ HYD DEMAND PUMPS..................AUTO (1-3), AUX (4)
                                      (green)    (red)
  * Set Hydraulic Demand Pump Selector Switches:
      No. 1:  AUTO (green)     No. 3:  AUTO (green)
      No. 2:  AUTO (green)     No. 4:  AUX (red)
```

FIG. 5A

```
▼ HYD DEMAND PUMPS..................AUTO (1-3), AUX (4)
                                      (green)    (green)
  * Set Hydraulic Demand Pump Selector Switches:
      No. 1:  AUTO (green)     No. 3:  AUTO (green)
      No. 2:  AUTO (green)     No. 4:  AUX (green)
                      ( ACCEPT )
```

FIG. 5B

```
▼ PACKS............................................................SET
                                                                   (red)
  * Set Pack Selector Switches:
      No. 1:  OFF (red)
      No. 2:  NORM (green)
      No. 3:  OFF (red)
```

FIG. 6A

```
▼ PACKS............................................................SET
                                                                   (green)
  * Set Pack Selector Switches:
      No. 1:  OFF (green)
      No. 2:  NORM (green)
      No. 3:  OFF (green)
                      ( ACCEPT )
```

SYSTEM AND METHOD FOR PRESENTING A DYNAMIC CHECKLIST TO THE USER OF A VEHICLE

BACKGROUND OF THE INVENTION

1. Field of the Invention

This invention pertains generally to the field of indicators or display units used in a vehicle and that provide information to the user of such vehicle.

2. Description of the Related Art

Checklists may be considered as a list of important or relevant actions, tasks, and/or steps to be taken in a specific or sequential order before a subsequent action is taken. Checklists are often employed as informational aids to reduce user failure caused by overlooking such important or relevant actions. When properly employed, checklists ensure that every such action gets accomplished and that none is overlooked.

In aviation, a plurality of checklists may be used by pilots to ensure that no such action is forgotten. If there are two pilots, a first pilot will call out an item appearing on the checklist, and a second pilot will provide a response applicable for the checklist item. For example; the first pilot could call out a checklist item shown as "FUEL QUANTITY" on the checklist. In response to the call out, the task could require the second pilot to check a fuel indicator to determine whether the actual fuel distribution falls within a configuration defined by the manufacturer and/or end-user, and whether the total fuel quantity meets the minimum fuel requirements for the subsequent flight. The second pilot could compare the actual values with the planned fuel requirements of the next flight. If the result of this comparison is favorable, the second pilot could call out the fuel onboard if such call out is the applicable response required by the checklist.

During this performance of a checklist, many disparate aircraft systems may be checked to ensure that each are operational and/or set in the proper, acceptable configuration. One checklist item may require the pilot to locate a fuel panel or a display unit and respond to the checklist item by verifying the fuel information is acceptable. The next checklist item may require the pilot to locate the panel on which a seat belt sign switch is installed and respond by verifying that it is set in the acceptable position as required by the checklist. Then, the next checklist item may require the pilot to locate the display unit for presenting weight and balance information and respond by comparing such information with the weight and balance information shown on an externally-generated report to verify the acceptability of the weight and balance configuration. Then, the next checklist item may require the pilot to locate an engine display panel and respond by selecting the specific switch to the acceptable position as stated by the checklist. Then, the next item may require the pilot to locate the panel on which a beacon lights switch is installed and respond by verifying that it is set in the acceptable position as required by the checklist. As the above discussion reveals, the various locations of the display units and panels of the many disparate systems installed in an aircraft requires the pilot to constantly adjust his or her head position and eye focus in the performance of the checklist.

BRIEF SUMMARY OF THE INVENTION

The embodiments disclosed herein present at least one novel and non-trivial system and method for presenting a dynamic checklist in a vehicle. The presentation of a the dynamic checklist on a single presentation unit such as a visual display unit includes the display of one or more checklist items and corresponding automated responses which indicate the acceptability of the checklist item.

In one embodiment, a system is disclosed for presenting a dynamic checklist to the user of a vehicle such as, but not limited to, a pilot of an aircraft. The system may be comprised of one or more vehicular sources of internal system data and a checklist generating processor, and a presentation unit such as a visual display unit. The processor could determine an automated response corresponding to each checklist item appearing on the dynamic checklist after receiving real-time internal system data and applying such data to an acceptability configuration defined by a manufacturer and/or end-user. From such determination, the processor could generate a presentation data set representative of a dynamic vehicular checklist comprised of each checklist item and its corresponding automated response, then provide such presentation data set to a presentation unit for presenting the dynamic checklist represented therein to the user, whereby the use is presented with acceptability information of one or more of the checklist items. As embodied herein, the visual appearance of the automated response could depend on the acceptability of checklist item. Also, the checklist item and automated response could be integrated into one checklist item, where the visual appearance of the integrated checklist item could depend on the acceptability of checklist item. In additional embodiments, the checklist item could be comprised of an expanded checklist item for providing the user with information corresponding to the acceptability configuration, where such additional information could be provided by a data source external to the vehicle. In addition, user input may be received from one or more sources, where such input could be used to control the expandability and collapsibility of the expanded checklist through an expander interface and/or accept a checklist item through an acceptance interface. If a user attempts to accept a checklist item but such item is not enabled for acceptance, then the processor could generate an alert to the user, where such alert may be presented visually, aurally, and/or tactilely.

In another embodiment, a method is disclosed for presenting a dynamic checklist to the user of a vehicle. Real-time internal system data that corresponds to a checklist item could be received. An automated response corresponding to the checklist item could be determined as a function of the real-time internal system information and a defined acceptability configuration. A presentation data set representative of a dynamic vehicular checklist could be generated, where such presentation data set may be comprised of the checklist item and its corresponding automated response. The presentation data set could be provided to a presentation unit for presenting the dynamic checklist represented therein to the user, whereby the user is presented with acceptability information of one or more of the checklist items.

In additional embodiments, external data corresponding to the checklist item could be received. The definition of the acceptability configuration may include the external data, and the external data may be presented in an expanded checklist item. Additionally, user input data could be received, where the user input could be used to expand and collapse an expanded checklist item through an expander interface and/or to accept an enabled checklist item through an acceptance interface. If the user data is representative of an attempt to accept a non-enabled checklist item, alert data may be generated and provided to the visual display unit, an aural alerting unit, and/or a tactile alerting unit, whereby an alert is visually, aurally, and/or tactilely presented to the user, respectively.

BRIEF DESCRIPTION OF THE DRAWINGS

FIG. 3A depicts exemplary illustration of an expanded dialog box for a "FUEL QUANTITY" FL checklist item.

FIG. 3B depicts exemplary illustration of an automated response for a "FUEL QUANTITY" FL checklist item.

FIG. 4A depicts exemplary illustration of an expanded dialog box for a "WEIGHT AND BALANCE" FL checklist item.

FIG. 4B depicts exemplary illustration of a first automated response for a "WEIGHT AND BALANCE" FL checklist item.

FIG. 4C depicts exemplary illustration of a second automated response for a "WEIGHT AND BALANCE" FL checklist item.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
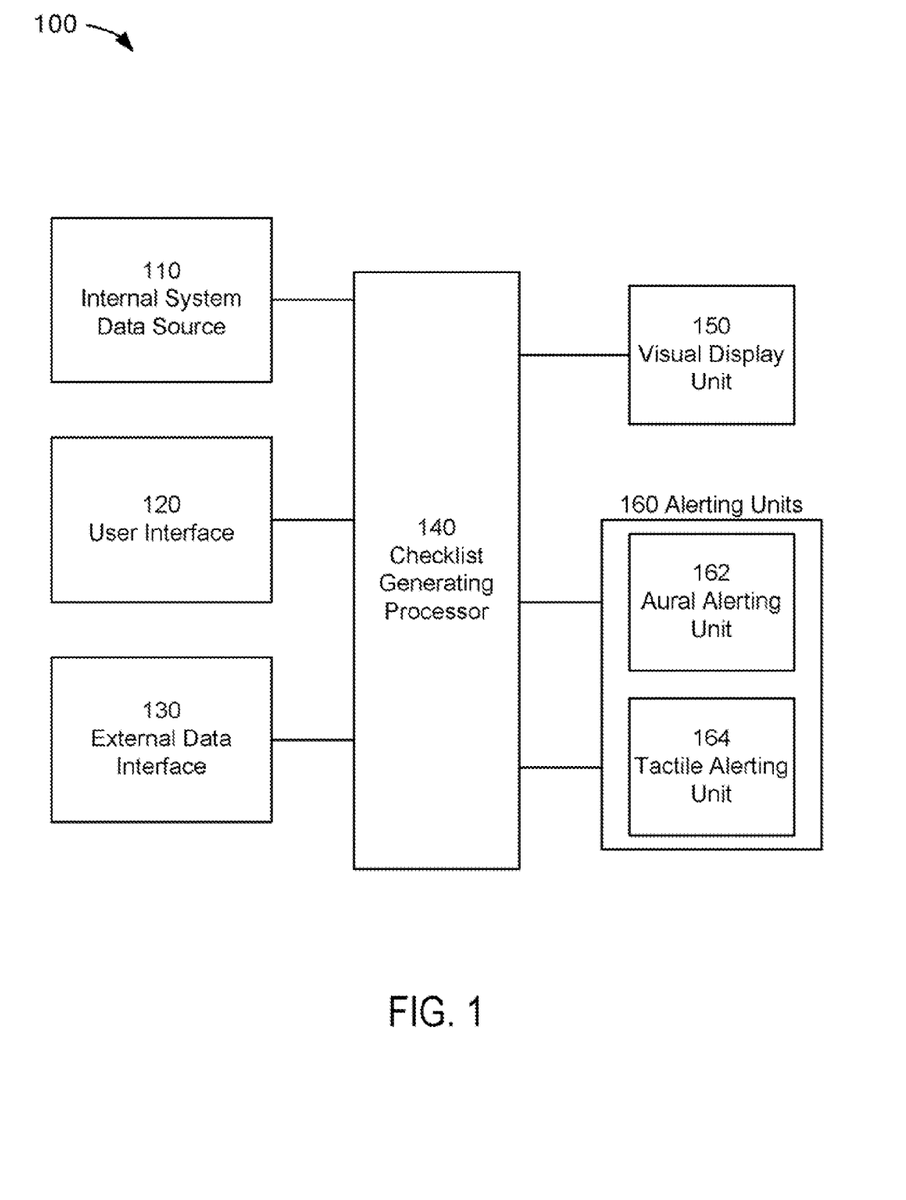
FIG. 1 depicts a block diagram of a dynamic checklist presentation system.

FIG. 1 depicts a block diagram of a dynamic checklist presentation system 100 suitable for implementation of the techniques described herein. The dynamic checklist presentation system 100 of an embodiment of FIG. 1 could include an internal system data source 110, a user interface 120, an external data source 130, a checklist generating ("CG") processor 140, a visual display unit 150, and/or alerting units 160.

It should be noted that, although the discussion herein will be drawn to checklist use by a pilot of an aircraft, the disclosures embodied herein are not limited to pilots and aircraft but could include other users as well as other vehicles (e.g., land vehicles, marine vehicles, space vehicles, etc. . . . ) and/or other systems in which a procedure has been adopted or may be adopted for the sequential performance of pre-determined tasks.

In an embodiment of FIG. 1, the internal system data source 110 could be comprised of any system installed in an aircraft that could provide aircraft system data representative of real-time aircraft system information. The internal system data source 110 may include, but is not limited to, one or more of the following systems and/or any panels, modules, components, units, and/or sub-systems thereof: air conditioning, auto flight, communications, electrical power, equipment/furnishings, fire protection, flight controls, fuel, hydraulic power, ice and rain protection, instruments, landing gear, lights, navigation, oxygen, pneumatic, vacuum, waste/water, central maintenance system, auxiliary power, doors, nacelles/pylons, windows, propellers/propulsors, main rotor, main rotor drive, tail rotor, tail rotor drive, rotors flight control, turbine/turboprop engine, engine fuel and control, ignition, air, engine controls, engine indicating, engine exhaust, engine oil, starting, turbocharging, water injection, accessory gearboxes, and reciprocating engine. As embodied herein, the internal system data source 110 may provide aircraft system data to the CG processor 140 for subsequent processing as discussed herein.

It should be noted that "data" could be comprised of any analog or digital signal, either discrete or continuous, which could contain information. As embodied herein, the terms "data" and "signal(s)" are treated synonymously.

In an embodiment of FIG. 1, the user interface 120 could be comprised of a system and/or any panel, module, component, unit, and/or sub-system thereof which facilitates pilot interaction with one or more checklist items as discussed in detail below, where such system could be incorporated with one or more of those aircraft systems listed above. In one embodiment, the user interface 120 could be comprised of a cursor-pointing device such as, but not limited to, a mouse and/or trackball enabling the pilot to interact with a graphical user interface ("GUI") depicted on the visual display unit 150. In another embodiment, the user interface 120 could be comprised of a display unit configured with a touch screen enabling the pilot to interact with a GUI. In another embodiment, the user interface 120 could be comprised of one or more tactile buttons and/or keys of a keyboard enabling the pilot to interact with one or more checklist items. In another embodiment, the user interface 120 could be comprised of a speech recognition system configured to receive appropriate oral commands from the pilot. As embodied herein, the user interface 120 may provide data representative of pilot input to the CG processor 140 for subsequent processing as discussed herein.

In an embodiment of FIG. 1, the external data source 130 could be comprised of any source for providing externally-generated aircraft information and/or flight information including, but not limited to, a datalink system, where such system could be incorporated with one or more of those aircraft systems listed above. A datalink system includes those system(s) that receive data from sources external to the aircraft including, but not limited to, ground stations and satellites. In an embodiment of FIG. 1, externally-generated information could be comprised of information generated by ground stations and/or ground systems such as, but not limited to, dispatch information, crew and/or passenger manifests, cargo load manifests, fuel delivery receipts, weight and balance, and/or aircraft maintenance information. As embodied herein, the external data source 130 may provide data representative of externally-generated aircraft information to the CG processor 140 for subsequent processing as discussed herein.

The CG processor 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The CG processor 140 may be driven, by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the CG processor 140 could be a processor(s) used by or in conjunction with any other system of the aircraft including, but not limited to, a processor(s) associated with the internal system data source 110, the user interface 120, the external data source 130, the visual display unit 150, the alerting units 160, or any combination thereof.

The CG processor 140 may be programmed or configured to receive as input data representative of information obtained from various systems and/or sources including, but not limited to, the internal system data source 110, the user interface 120, and the external data source 130. As embodied herein, the terms "programmed" and "configured" are synonymous. The CG processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The CG processor 140 may be programmed or configured to execute the method discussed in detail below. The CG processor 140 may be programmed or configured to provide output data to various systems and/or units including, but not limited to, the visual display unit 150. The CG processor 140 may be electronically coupled to the visual display unit 150 and/or the alerting units 160 to facilitate the providing of output data.

In an embodiment of FIG. 1, the visual display unit 150 could comprise any unit configured to visually present a dynamic checklist depicting one or more checklist items and corresponding responses. For each checklist item, the visual appearance of a response could depend on whether the response is automated and meets the acceptability configuration.

In one embodiment, the visual appearance of a checklist item, an automated response, and/or acceptance GUI as discussed in detail below may be configured to present a plurality of colors, where each color could signify whether or not an automated response falls within the acceptability configuration. For the purpose of illustration and not limitation, the color green could be used to indicate an automated response falling within the acceptability configuration, red could be used to indicate an automated response falling outside the acceptability configuration, and/or amber or yellow could be used to indicate an automated response falling near a limit of the acceptability configuration. Where the response is fixed and not automated, white or cyan could be used.

In another embodiment, the visual appearance(s) may be configured to present steady or intermittent (i.e., flashing) indications to signify whether or not an automated response falls within the acceptability configuration, where a steady indication could indicate an automated response falling within the acceptability configuration, and an intermittent indication could indicate an automated response falling outside the acceptability configuration.

In another embodiment, the visual appearance(s) may be configured to present textual and/or non-textual indications. For example, textual indications could include alphanumeric characters as discussed and shown in the examples that follow. Non-textual indications could include symbols, pictures, and other collections of pixels/vectors not forming alphanumeric characters such as, but not limited to, an image of a checkmark used to indicate an automated response falling within the acceptability configuration and an image of a stop sign used to indicate an automated response falling outside the acceptability configuration.

In another embodiment, the visual appearance(s) may be configured to present a combination of the configurations discussed in the preceding paragraphs. For example, a green checkmark or green text could indicate an automated response falling within the acceptability configuration, and a red stop sign or red text could indicate an automated response falling outside the acceptability configuration.

In an embodiment of FIG. 1, the alerting units 160 could be comprised of any alerting unit which may present the pilot with aural and/or tactile alerts regarding checklist information including, but not limited to, an aural alerting unit 162 and/or a tactile alerting unit 164. As will be discussed below, each of these units could be capable of presenting one or more responses to a checklist item, where the presentation of a specific response could depend on an acceptability configuration of the checklist item as defined by a manufacturer and/or end-user.

In an embodiment of FIG. 1, the aural alerting unit 162 may be any unit capable of producing and/or presenting checklist information to the pilot aurally. Aural alerts may be sounds and/or verbal statements corresponding to a checklist item and/or response to such checklist item. As embodied herein, aural information could be presented in combination with or simultaneous to visual presentations and/or tactile presentations.

In an embodiment of FIG. 1, the tactile alerting unit 164 may be any unit capable of producing and/or presenting checklist information to the pilot tactilely. Tactile responses may be any tactile stimulus and may be integrated with other systems such as, but not limited to, the user interface 120 and/or the visual display unit 150. For example, a cursor-pointing device of the user interface 120 and/or a touch screen of the visual display unit 150 could be configured to vibrate if a pilot clicks on or touches an "ACCEPT" button when a real-time response to a checklist item falls outside of the acceptability configuration. As embodied herein, tactile information could be presented in combination with or simultaneous to visual presentations and/or aural presentations.

As embodied herein, the visual display unit 150 and/or the alerting units 160 could be integrated into a portable device, including but not limited to, a handheld device configured for presenting the dynamic checklist and/or receiving data from the internal system data source 110, the user interface 120, the external data source 130, or any combination thereof. As embodied herein, the portable device may receive data representative of a presentation data set from the CG processor 140 and present the dynamic checklist on a visual display. In another embodiment, a portable device capable of producing sounds may present one or more aural alerts such as, but not limited to, verbal statements if a pilot attempts to "ACCEPT" a checklist item falling outside of the acceptability configuration. In another embodiment, a portable device capable of producing tactile stimuli may present one or more tactile alerts such as, but not limited to, a vibration where such device could be set to vibrate if a pilot attempts to "ACCEPT" a checklist item falling outside of the acceptability configuration.

The advantages and benefits of the embodiments discussed herein may be illustrated by showing examples of a dynamic checklist depicting a plurality of checklist items and corresponding automated responses that are responsive to real-time aircraft system data and external data. In an embodiment of FIG. 2A, an exemplary illustration of a "BEFORE STARTING" checklist 202 is shown. Those skilled in the art know that numerous checklists are employed by pilots while operating an aircraft. Such checklists could include, but are not limited to, the following operations: power up, preflight, preparation, before starting, before taxi, taxi out, before take-off, after take-off, descent, approach, landing, taxi in, after parking, and/or termination. While the following discussion and examples will be drawn to the "BEFORE STARTING" checklist 202, the embodiments disclosed herein are not limited to such checklist and/or those specific checklist items appearing thereon. For the sake of illustration and not limitation, the "BEFORE STARTING" checklist 202 includes items known to those skilled in the art that may be found on a B-747 aircraft. It should be noted that, although the borders surrounding a collapsed dialog box 204 are shown, they could be hidden from the pilot's view.

Figure 2A:
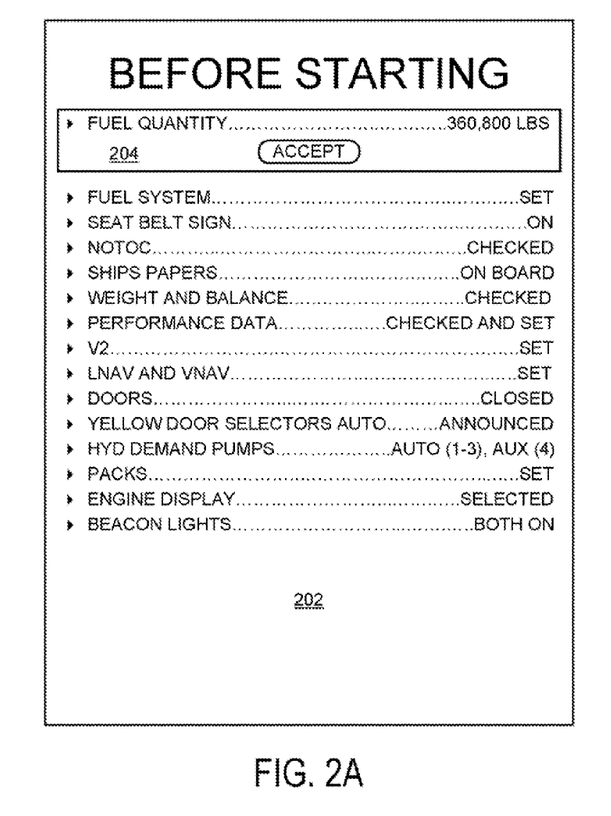
FIG. 2A depicts an exemplary illustration of a "BEFORE STARTING" checklist.
Figure 2B:
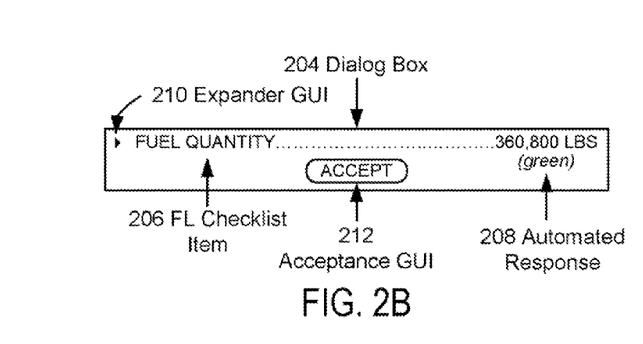
FIG. 2B depicts an exemplary illustration of a collapsed dialog box for a "FUEL QUANTITY" first-level ("FL") checklist item.

In an embodiment of FIG. 2B, the collapsed dialog box 204 may be comprised of any graphic used to present checklist information to a pilot and/or receiving pilot input responsive to the information. The collapsed dialog box 204 could be comprised of the following components: a first-level checklist item ("FL checklist item") 206, an automated response 208, an expander GUI 210, and/or an acceptance GUI 212. As shown in illustration of FIG. 2B, "FUEL QUANTITY" is the FL checklist item 206, and "360,800 LBS" is the corresponding automated response 208. It should be noted a second-level checklist item ("SL checklist item") may correspond to those responses that are not automated.

The use of the FL checklist item 206 and automated response 208 may mirror a procedure employed by pilots, where a first pilot will call out the FL checklist item 206 and a second pilot will provide a response applicable for the FL checklist item; here, one pilot could call out "FUEL QUANTITY" and the other pilot could respond with "360,800 LBS" after performing the task corresponding to the FL checklist item. Here, the task could require the responding pilot to check a fuel indicator to determine whether the actual fuel distribution falls within a configuration defined by the manufacturer and/or end-user and whether the total fuel quantity meets the minimum fuel requirements for the subsequent flight. Then, the responding pilot could compare the actual values with the planned fuel requirements of the next flight. If the result of this comparison is favorable, the responding pilot could call out the fuel onboard if such call out is the applicable response required by the checklist procedure.

The inclusion of the FL checklist item 206 in the checklist is a configuration used by a manufacturer or end-user. In the example, the FL checklist item 206 of "FUEL QUANTITY" has been included in the configuration of the "BEFORE STARTING" checklist of FIG. 2A by a manufacturer or end-user along with the other checklist items shown to the right of their corresponding expander GUIs. The automated response 208 of "360,800 LBS" corresponding to the FL checklist item 206 shown in FIG. 2B may be reported automatically and in real-time using fuel quantity data provided by one or more aircraft systems. As shown in FIG. 2B, the automated response 208 is presented graphically as green text.

In an embodiment of FIG. 2B, the appearance of the automated response 208 may be configurable by a manufacturer and/or end-user. In one embodiment, the appearance of the automated response 208 may be configured to display colors to indicate whether the automated response 208 falls within the acceptability configuration defined by a manufacturer and/or end-user. For example, green could indicate the automated response 208 falling within the acceptability configuration, and red could indicate the automated response 208 falling outside the acceptability configuration. Additionally, amber or yellow could indicate the automated response 208 falling close to the acceptability configuration. As shown in FIG. 2B, the appearance of the color green could indicate that the "FUEL QUANTITY" of "360,800 LBS" falls within the acceptability configuration defined by the manufacturer and/or end-user.

In an embodiment of FIG. 2B, the expander GUI 210 could represent a user interface to facilitate the viewing of an expanded FL checklist item corresponding to the FL checklist item 206. In one embodiment, the expander GUI 210 could comprise a GUI to enable pilot interaction with the checklist. It should be noted that, although a triangle is used in the following examples, a manufacturer and/or end-user may configure any graphic suitable for use as a GUI. The GUI could be used in conjunction with a touch screen and/or a cursor-pointing device. If a touch screen is used, the pilot may touch the screen at the expander GUI 210 to view the expanded FL checklist item. If a cursor-pointing device such as, but not limited to, a mouse and/or trackball is used, the pilot may point to the expander GUI 210 and click to view the expanded FL checklist item. If the visual display unit is configured with tactile button(s) for which one such button is assigned to the expander GUI 210, the pilot could press the assigned button.

The examples that follow will be drawn to the expander GUI 210; however, a GUI may not be necessary for providing the pilot with a user interface to facilitate the viewing of an expanded FL checklist item. In one embodiment, an area on the collapsed dialog box 204 and/or one of its components may be integrated with the functionality of an expander GUI. For example, the expanded FL checklist item may be viewed by touching and/or pointing-and-clicking on that area of the dialog box 204 and/or rolling the cursor over one of its components. In another embodiment, a user interface may be comprised of a voice command system, where the expanded FL checklist item may be viewed by the pilot issuing an appropriate oral command.

In the following paragraphs, examples are shown to illustrate the dynamic checklist as embodied herein. These illustrations are intended to provide exemplars that could be used in the dynamic checklist presentation system 100, and are not intended to provide a limitation to the embodiments discussed herein in any way, shape, or form.

In an embodiment of FIG. 3A, an expanded dialog box (depicted with its borders) corresponding to the expanded FL checklist item of the FL checklist item 206 is shown, where such dialog box could have been accessed by touching and/or pointing-and-clicking on the expander GUI 210. As embodied herein, the placement and/or appearance of the expanded dialog box of FIG. 3A may be configured in a plurality of ways. In one example, the placement of the expanded dialog box could result in a downward movement of other checklist items. In another example, the expanded dialog box could be displayed on top of checklist items. In another example, the appearance of the expanded dialog box could cause the other checklist items to change appearances with visual effects such as, but not limited to, fading, disappearing, shading, and/or varying the brightness, intensity, etc. . . .

As shown in FIG. 3A, the manufacturer and/or end-user have configured the expander GUI 210 to change appearance to a downward pointing triangle when the expanded dialog box has been accessed. If the downward pointing triangle has been configured as a GUI, touching or clicking such GUI could cause the expanded dialog box to return to the collapsed dialog box 204 of FIG. 2B. If an area of the expanded dialog box of FIG. 3A has been integrated with the functionality for collapsing the expanded dialog box, the collapsed dialog box may be viewed, for example, by touching and/or pointing-and-clicking on that area of the dialog box. If the user interface is comprised of a voice command system, the collapsed dialog box may be viewed by the pilot issuing an appropriate oral command.

As illustrated in FIG. 3A, the expanded dialog box comprises information corresponding to the performance of the task corresponding to the FL checklist item of "FUEL QUANTITY." The CG processor 140 may be configured to automatically perform the same task required of the responding pilot as discussed above. The automated performance could be comprised of receiving data representative of the actual, real-time fuel distribution among the fuel tanks and total fuel quantity, where such data may be provided by an applicable internal system data source 110 such as, but not limited to, a fuel system. Then, the CG processor 140 could provide data representative of the actual, real-time fuel distribution among the fuel tanks to the visual display unit 150, which could present such fuel information as shown in the "ACTUAL" column.

As discussed above, the task also requires a comparison of the actual values with the planned fuel requirements of the next flight. Here, the automated performance of the CG processor 140 could be comprised of receiving data representative of the planned fuel requirements, where such data may have been externally-generated by a ground source such as, but not limited to, a company's flight dispatch center; transmitted to the aircraft; received by the external data interface 130, and provided to the CG processor 140. Then, the CG processor 140 could provide data representative of the planned fuel requirements to the visual display unit 150, which could present such fuel information as shown in the "PLANNED" column.

In the examples that follow, some of the checklist items shown in the "BEFORE STARTING" checklist of FIG. 2A will be used to illustrate the possible presentations of automated responses using assumed acceptability configurations. The following examples and assumptions are provided for the purpose of illustration and not limitation.

For the examples provided in the drawings of FIG. 3, assume that the acceptability configuration defined by the manufacturer and/or end-user allows for a normal variation of 1000 lbs. between the planned distribution and the actual distribution among the fuel tanks, and a normal variation of 2500 lbs. between the planned total fuel quantity and actual total fuel quantity. If any of the variations have been exceeded, the automated response will be a warning shown in red. In order to comply with the checklist and enable acceptance of the FL checklist item, the exceeded variations will have to be resolved. As embodied herein, the CG processor 140 may be configured to receive data representative of actual and planned fuel distribution and fuel quantity information from an applicable internal system data source 110 and the external data interface 130, respectively, and provide such data to the visual display unit 150.

Assume that the pilot has just begun performing the "BEFORE STARTING" checklist and the expanded FL checklist item of the FL checklist item 206 of "FUEL QUANTITY" has not been viewed. As indicated in FIG. 3A, the automated response of "360,800" is green, thereby informing the pilot that both the fuel distribution and fuel quantity fall within the acceptability configuration. If the pilot were to view the expanded FL checklist item, the green indications of the two outboard ("O/B") tanks, two inboard ("I/B") tanks, the center tank, and total fuel quantity highlight that each of these fall within the acceptability configuration. As such, the pilot may complete the FL checklist item 206 by pointing to and clicking on the "ACCEPT" acceptance GUI.

In FIG. 3B, the automated response of "360,000" is red, thereby warning the pilot that the fuel distribution and/or fuel quantity exceed the acceptability configuration. When the expanded FL checklist item is viewed, the red indications of the O/B tanks and center tank highlight the reason for the warning; here, the actual distribution of each O/B tank and the center tank exceeds the planned distributions by more than 1000 lbs. each, thereby exceeding the acceptability condition as shown in the expanded dialog box. Also, the pilot's ability to accept the FL checklist item of "FUEL QUANTITY" may be disabled by removing the "ACCEPT" acceptance GUI completely from view. In order to comply with the FL checklist item and enable the pilot's ability to accept "FUEL QUANTITY" through the "ACCEPT" acceptance GUI, the pilot will have to resolve the discrepancies.

For the examples provided in the drawings of FIG. 4, assume that the acceptability configuration defined by the manufacturer and/or end-user allows for a normal variation of 10,000 lbs. for zero fuel weight ("ZFW") and a variation up to 2 percent of the mean aerodynamic chord ("MAC") between the planned center of gravity ("CG") and the actual CG. Additionally, assume that the manufacturer and/or end-user have decided to caution the pilot when a CG quotient variation falls between 2 and 3 percent and to warn the pilot when a CG quotient variation equals or exceeds 3 percent. If a caution is issued, the pilot could be informed that the CG quotient variation is close to being exceeded; if a warning is issued, the CG quotient variation has been exceeded and will have to be resolved in order to comply with the checklist and enable acceptance of the FL checklist item. As embodied herein, the CG processor 140 may be configured to receive data representative of actual and planned weight and balance information from an applicable internal system data source 110 and the external data interface 130, respectively, and provide such data to the visual display unit 150.

Assume that the pilot has reached the "WEIGHT AND BALANCE" FL checklist item of the "BEFORE STARTING" checklist. As indicated in FIG. 4A, the automated response of "CHECKED" is green, thereby informing the pilot that the ZFW and CG fall within the acceptability configuration defined by the manufacturer and/or end-user. As such, the pilot may complete the FL checklist item by pointing to and clicking on the "ACCEPT" acceptance GUI.

In FIG. 4B, the automated response of "CHECKED" is amber, thereby cautioning the pilot that the ZFW and/or CG fall within the cautionary variation configured by the manufacturer and/or end-user. When the expanded FL checklist item is viewed, the amber indication of the CG highlights the reason for the caution; here; the actual CG of 26.2 percent presently exceeds the planned CG of 25.5 percent by 2.75 percent (which is the quotient of 0.262 divided by 0.255), thereby being close to exceeding the acceptability configuration defined by the manufacturer and/or end-user. As such, the pilot may complete the FL checklist item by pointing to and clicking on the "ACCEPT" acceptance GUI.

In FIG. 4C, the automated response of "CHECKED" is red, thereby warning the pilot that the ZFW and/or CG fall within the warning variation configured by the manufacturer and/or end-user. When the expanded checklist item is viewed, the red indication of the CG highlights the reason for the warning; here, the actual CG of 26.3 percent exceeds the planned CG by 3.14 percent (which is the quotient of 0.263 divided by 0.255), thereby exceeding the acceptability condition as shown in the expanded dialog box. Also, the pilot's ability to accept the checklist item of "WEIGHT AND BALANCE" may be disabled by removing the "ACCEPT" acceptance GUI completely from view. In order to comply with the checklist item and enable the pilot's ability to accept "WEIGHT AND BALANCE" through the "ACCEPT" acceptance GUI, the pilot will have to resolve the discrepancies.

Figure 5A:
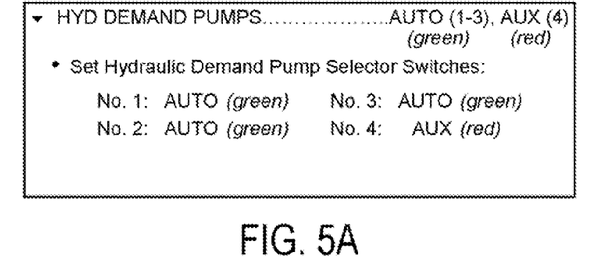
FIG. 5A depicts exemplary illustration of a first automated response for a "HYD DEMAND PUMPS" FL checklist item.
Figure 5B:
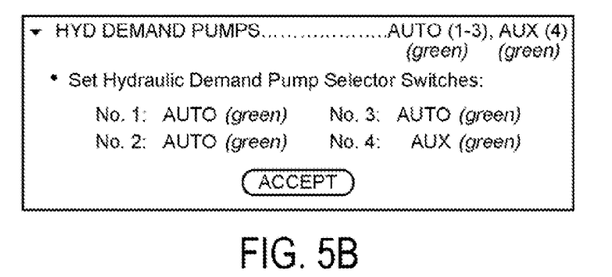
FIG. 5B depicts exemplary illustration of a second automated response for a "HYD DEMAND PUMPS" FL checklist item.

For the examples provided in the drawings of FIG. 5, assume that the acceptability configuration defined by the manufacturer and/or end-user requires the hydraulic demand pump selector switches of the No. 1, No. 2, and No. 3 hydraulic systems to be set to "AUTO" and the hydraulic pump switch of the No. 4 hydraulic system to be set to "AUX." If any switch is not set accordingly, the automated response will be a warning shown in red. In order to comply with the checklist and enable acceptance of the checklist item, any discrepancy will have to be resolved. As embodied herein, the CG processor 140 may be configured to receive data representative of hydraulic demand pump selector switch information from an applicable internal system data source 110 such as, but not limited to, the hydraulic system and provide such data to the visual display unit 150.

Assume that the pilot has reached the "HYD DEMAND PUMPS" FL checklist item of the "BEFORE STARTING" checklist and that the position of all four hydraulic demand pump selector switches are set to "AUTO." As indicated in FIG. 5A, part of the automated response of "AUTO (1-3)" is green, thereby informing the pilot that the hydraulic demand switches of the No. 1, No. 2, and No. 3 systems are set correctly to the "AUTO" position; however, the other part of the automated response of "AUX (4)" is red, thereby warning the pilot that the hydraulic demand pump selector switch of the No. 4 hydraulic system is not set in accordance with the acceptability configuration as shown in the expanded FL checklist item, i.e., not set in the "AUX" position. Also, the pilot's ability to accept the FL checklist item of "HYD DEMAND PUMPS" has been disabled by removing the "ACCEPT" acceptance GUI.

In order to comply with the checklist, the pilot is required to change to position of the No. 4 hydraulic demand pump selector switch. Once the switch position is set to the "AUX" position, the automated response of "AUX (4)" will change to green and the "ACCEPT" acceptance GUI will be enabled as shown in FIG. 5B. Then, the pilot may complete "HYD DEMAND PUMPS" FL checklist item by pointing to and clicking on the "ACCEPT" acceptance GUI.

Figure 6A:
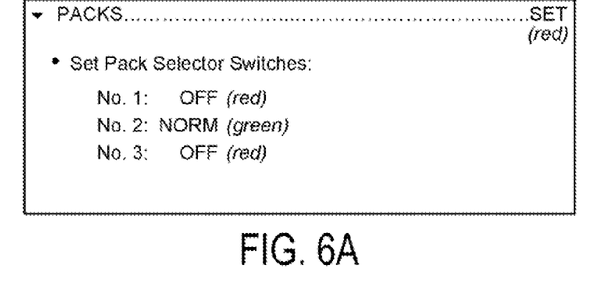
FIG. 6A depicts exemplary illustration of a first automated response for a "PACKS" FL checklist item.
Figure 6B:
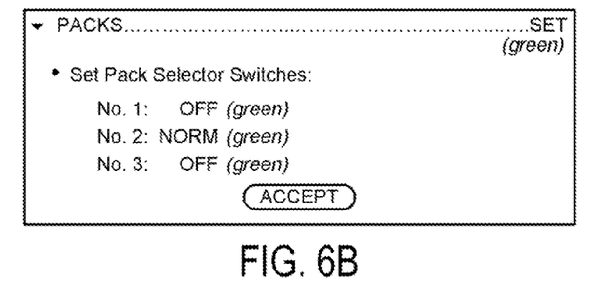
FIG. 6B depicts exemplary illustration of a second automated response for a "PACKS" FL checklist item.

For the examples provided in the drawings of FIG. 6, assume that the acceptability configuration defined by the manufacturer and/or end-user requires the pack selector switches of the No. 1 and No. 3 pack systems to be set to "OFF" and the pack selector switch of the No. 2 pack system to be set to "NORM." If any switch is not set accordingly, the automated response will be a warning shown in red. In order to comply with the checklist and enable acceptance of the FL checklist item, any discrepancy will have to be resolved. As embodied herein, the CG processor 140 may be configured to receive data representative of pack selector switch information from an application internal source such as, but not limited to, the air conditioning system and provide such data to the visual display unit 150.

Assume that the pilot has reached the "PACKS" FL checklist item of the "BEFORE STARTING" checklist and that the position of all three pack selector switches are set to "NORM." As indicated in FIG. 6A, the automated response of "SET" is red, thereby warning the pilot that one or more of the pack selector switches are not set in accordance with the acceptability configuration Also, the pilot's ability to accept the FL checklist item of "PACKS" has been disabled by removing the "ACCEPT" acceptance GUI. When the expanded FL checklist item is viewed, the red indications of the No. 1 and No. 3 pack selector switches highlight the reason for the warning; here, these are not set to the "OFF" position. In order to comply with the checklist, the pilot is required to change the position of the No. 1 and No. 3 pack selector switches. Once these switch positions are set to the "OFF" position, the automated response of "SET" will change to green and the "ACCEPT" acceptance GUI will be enabled as shown in FIG. 6B. Then, the pilot may complete "PACKS" FL checklist item by pointing to and clicking on the "ACCEPT" acceptance GUI.

Figure 7A:
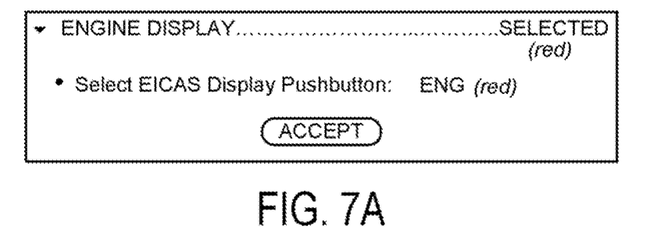
FIG. 7A depicts exemplary illustration of a first automated response for an "ENGINE DISPLAY" FL checklist item.
Figure 7B:
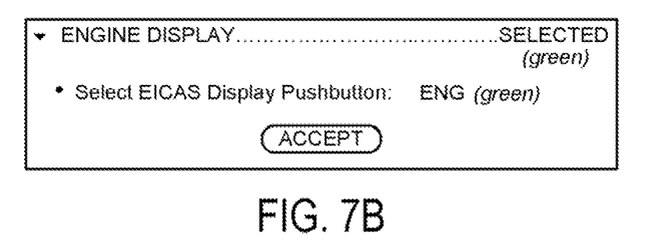
FIG. 7B depicts exemplary illustration of a second automated response for an "ENGINE DISPLAY" FL checklist item.

For the examples provided in the drawings of FIG. 7, assume that the acceptability configuration defined by the manufacturer and/or end-user requires the pilot to select the "ENG" pushbutton switch of the EICAS display system. If the switch is not set accordingly, the automated response will be a warning shown in red. In order to comply with the checklist and enable acceptance of the FL checklist item, any discrepancy will have to be resolved. As embodied herein, the CG processor 140 may be configured to receive data representative of EICAS display pushbutton switch information from an application internal source such as, but not limited to, the EICAS system and provide such data to the visual display unit 150.

Assume that the pilot has reached the "ENGINE DISPLAY" FL checklist item of the "BEFORE STARTING" checklist and that the "ENG" pushbutton switch has not been selected. As indicated in FIG. 7A, the automated response of "SELECTED" is red, thereby warning the pilot that the "ENG" pushbutton switch is not set in accordance with the acceptability configuration. Also, the pilot's ability to accept the FL checklist item of "ENGINE DISPLAY" has been disabled by removing the "ACCEPT" acceptance GUI. When the expanded FL checklist item is viewed, the red indication of "ENG" highlights the reason for the warning; here, the pushbutton switch has not been selected. In order to comply with the checklist, the pilot is required to press the "ENG" pushbutton switch. Once this switch has been pressed, the automated response of "SELECTED" will change to green and the "ACCEPT" acceptance GUI will be reactivated as shown in FIG. 7B. Then, the pilot may complete "ENGINE DISPLAY" FL checklist item by pointing to and clicking on the "ACCEPT" acceptance GUI.

Figure 8A:
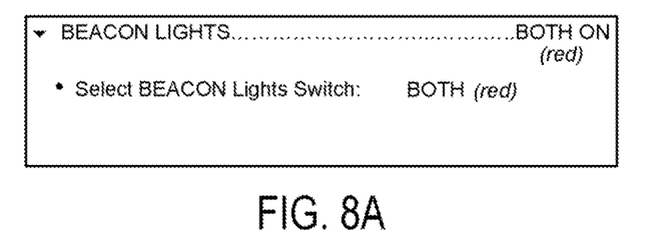
FIG. 8A depicts exemplary illustration of a first automated response for a "BEACON LIGHTS" FL checklist item.
Figure 8B:
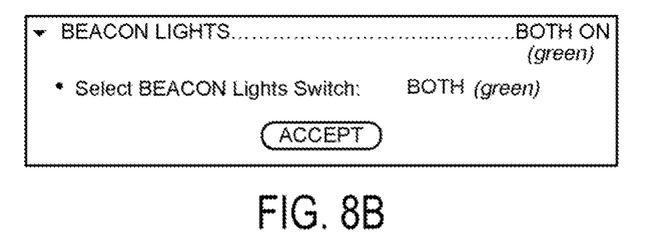
FIG. 8B depicts exemplary illustration of a second automated response for a "BEACON LIGHTS" FL checklist item.

For the examples provided in the drawings of FIG. 8, assume that the acceptability configuration defined by the manufacturer and/or end-user requires the pilot to select the "BOTH" switch of the beacon lights system. If the switch is not set accordingly, the automated response will be a warning shown in red. In order to comply with the checklist and enable acceptance of the FL checklist item, any discrepancy will have to be resolved. As embodied herein, the CG processor 140 may be configured to receive data representative of beacon lights switch information from an application internal source such as, but not limited to, the lights system and provide such data to the visual display unit 150.

Assume that the pilot has reached the "BEACON LIGHTS" FL checklist item of the "BEFORE STARTING" checklist and that the "BEACON" lights switch has not been selected. As indicated in FIG. 8A, the automated response of "BOTH ON" is red, thereby warning the pilot that the "BEACON" lights switch is not set in accordance with the acceptability configuration. Also, the pilot's ability to accept the FL checklist item of "BEACON LIGHTS" has been disabled by removing the "ACCEPT" acceptance GUI. When the expanded FL checklist item is viewed, the red indication of "BOTH" highlights the reason for the warning; here, the "BOTH" switch position has not been selected. In order to comply with the checklist, the pilot is required to change the position of the switch. Once the switch position has been set to the "BOTH" position, the automated response of "BOTH ON" will change to green and the "ACCEPT" acceptance GUI will be reactivated as shown in FIG. 8B. Then, the pilot may complete "BEACON LIGHTS" FL checklist item by pointing to and clicking on the "ACCEPT" acceptance GUI.

Figure 9A:
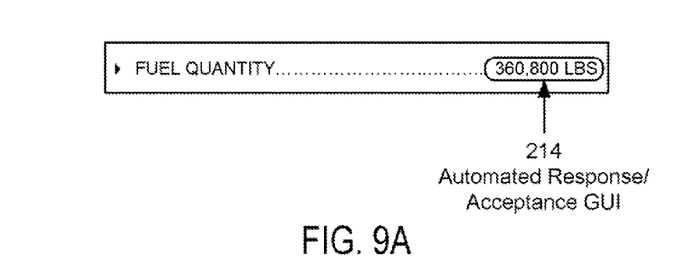
FIG. 9A depicts exemplary illustration of a first pilot acceptance and automated response for a "FUEL QUANTITY" FL checklist item.

Although the above examples have been drawn to the "ACCEPT" acceptance GUI, the pilot acceptance may be integrated with the other components of the display box. In an embodiment of FIG. 9A, pilot acceptance has been integrated with the automated response as shown by the GUI of item 214. When the automated response falls within the acceptability configuration defined by the manufacturer and/or end-user, a GUI may be enabled as indicated by the border around the automated response in FIG. 9A, and the use of color could be optional. Alternatively, the use of colored text could indicate an enabled GUI, and the use of a border may be optional. For example, a color such as green could indicate an enabled GUI.

Figure 9B:
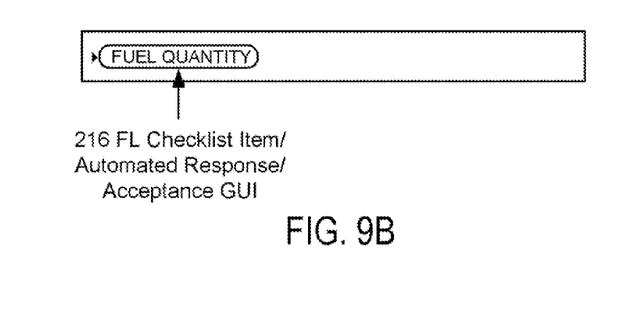
FIG. 9B depicts exemplary illustration of a second pilot acceptance and automated response for a "FUEL QUANTITY" FL checklist item.

In an embodiment of FIG. 9B, the pilot acceptance and the automated response may be integrated with the FL checklist item. When the automated response falls within the acceptability configurable defined by the manufacturer and/or end-user, the GUI shown by item 216 may be enabled as indicated by the border around the FL checklist item in FIG. 9B, and the use of color could be optional. Alternatively, the use of colored text could indicate an enabled GUI, and the use of a border may be optional. For example, a color such as green could indicate an enabled GUI.

A GUI may not be the only user interface to facilitate the pilot acceptance of a FL checklist item. In one embodiment, an area on the dialog box and/or one of its components may be integrated with the functionality of the pilot acceptance. In another embodiment, a user interface may comprise a voice command system, where the pilot may accept the FL checklist item by issuing an appropriate oral command.

As stated above, a response need not be automated. For example, the "BEFORE STARTING" checklist of FIG. 2A includes an FL checklist item of "SHIPS PAPERS." Here, the manufacturer and or end-user could require the responding pilot to perform the task of visually checking for the physical presence of certain documents required for flight and respond with "ON BOARD" after performing the task. In such a case, the response could be fixed and presented in a color not assigned or configured for an automated response.

Figure 10:
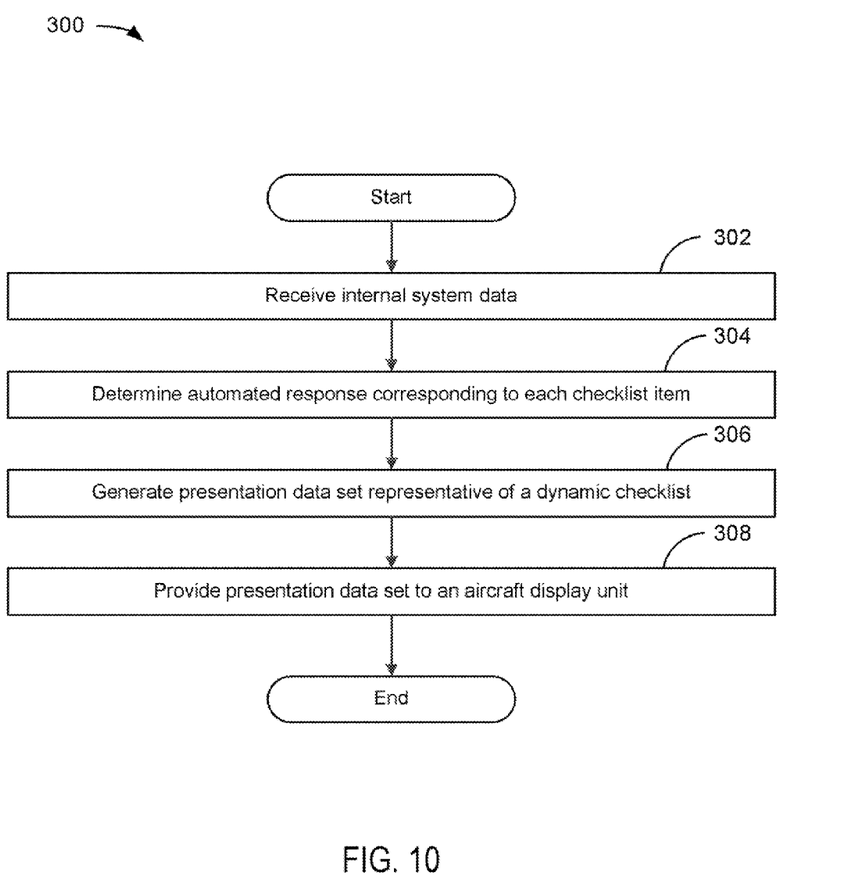
FIG. 10 depicts a flowchart of a method for presenting a dynamic checklist to the user of a vehicle.

FIG. 10 depicts a flowchart 300 of an example of a method for presenting a dynamic checklist on an aircraft display unit, where the CG processor 140 may be programmed or configured with instructions corresponding to the following modules. As embodied herein, the CG processor 140 may be a processor found in the internal system data source 110, the user interface 120, the external data source 130, the visual display unit 150, the aural alerting unit 162, the tactile alerting unit 164, or any combination thereof. Also, the CG processor 140 may be a processor of a module such as, but not limited to, a printed circuit card having one or more input interfaces to facilitate data communications with the CG processor 140, i.e., the receiving and providing of data. As necessary for the accomplishment of the following modules embodied in FIG. 10, the receiving of data is synonymous and/or interchangeable with the retrieval of data, and the providing of data is synonymous and/or interchangeable with the making available or supplying of data.

The method begins with module 302 with the receiving of internal system data, where such data could be data representative of real-time internal system information provided by at least one internal system data source 110. In an additional embodiment, data representative of user input may be received, where such data could be received from at least one user interface 120. In an additional embodiment, data representative of externally-generated information may be received, where such data could be received from at least one external data source 130.

The method continues with module 304 with the determining of an automated response, where such response could correspond to each FL checklist item of a checklist and could be determined as a function of the real-time internal system information and a pre-defined acceptability configuration corresponding to such FL checklist item. As embodied herein, such automated response may be a real-time response.

The method continues with module 306 with the generating of a presentation data set, where such data set could be representative of a dynamic vehicular checklist comprised of each FL checklist item and its corresponding automated response. In one embodiment, the visual appearance of the automated response could be dependent upon the acceptability of the FL checklist item as discussed above, where one appearance could correspond to an acceptable FL checklist item falling within the acceptability configuration, and one appearance could correspond to an unacceptable checklist item falling outside of the acceptability configuration. The visual appearance of the automated response could be comprised of text or non-text, a plurality of colors, and/or steady or intermittent indications. In another embodiment, the visual appearance of the automated response and its corresponding FL checklist item could be integrated into one integrated FL checklist item. The visual appearance of the integrated FL checklist item could be comprised of text or non-text, a plurality of colors, and/or steady or intermittent indications, depending on the acceptability of the FL checklist item.

In one embodiment, one or more FL checklist items represented in the presentation data set could be comprised of expanded FL checklist item(s), where each expanded FL checklist item could present the real-time internal system information corresponding to the acceptability configuration as discussed above. As embodied herein, the presentation of the expanded checklist could be set as a default presentation for one or more FL checklist items.

If the embodiment employs at least one user interface 120 for facilitating user input, data representative of the user input may be received by the CG processor 140 through an expander interface, where such expander interface could be used in conjunction with one or more expanded FL checklist item(s). If such data is received, the visual appearance of each expanded checklist item could change in response to the user input; for example, an expanded FL checklist item could become a collapsed FL checklist item, and a collapsed FL checklist item could become an expanded FL checklist item.

As embodied herein, the user input could be made through a cursor-pointing device and/or touch screen, where the expander interface may be a GUI. Additionally, the user input could be made by pressing a tactile button, where the expander interface may be comprised of tactile button(s). Additionally, the user input could be made through an appropriate oral command issued by the user, where the expander interface may be comprised of a voice command system.

In an embodiment in which at least one external data source 130 is employed, external data representative of externally-generated information may be received by the CG processor 140, where such information corresponds to at least one FL checklist item. The acceptability configuration could be defined to include the externally-generated information. If so, the determination of the automated response of module 302 above could be affected with the inclusion of the externally-generated information in the definition of the acceptability configuration. If one or more FL checklist items represented in the presentation data set are comprised of expanded FL checklist item(s), each expanded FL checklist item could present the real-time internal system information corresponding to the acceptability configuration, the externally-generated information of such FL checklist item, or both.

In an embodiment in which at least one user interface 120 is employed for facilitating user input, data representative of the user input may be received by the CG processor 140 through an acceptance interface, where such acceptance interface could be used in conjunction with one or more FL checklist item(s). If the user input was made through an enabled acceptance interface, then the FL checklist item corresponding to the acceptance interface may be considered as completed. As embodied herein, an acceptance interface could be enabled by default if acceptance interface is not configured with an enablement and disablement feature. If the acceptance interface is configured with an enablement and disablement feature, then the enabling and disabling of such acceptance interface could be based upon the acceptability of its corresponding FL checklist item.

As embodied herein, the user input could be made through a cursor-pointing device and/or touch screen, where the acceptance interface may be a GUI. Additionally, the user input could be made by pressing a tactile button, where the acceptance interface may be comprised of tactile button(s). Additionally, the user input could be made through an appropriate oral command issued by the user, where the acceptance interface may be comprised of a voice command system.

The acceptance GUI may be disabled, where such disabling could be indicated by a plurality of indications such as, but not limited to, removing it from view or changing the visual appearance of a disabled acceptance GUI to make it appear differently from an enabled acceptance GUI. In another embodiment, the acceptance GUI could be integrated with the automated response, its corresponding FL checklist item, or both, to form an integrated acceptance GUI. The visual appearance of the acceptance GUI could be comprised of text or non-text, a plurality of colors, and/or steady or intermittent indications, depending on the acceptability of the FL checklist item.

If the user tries to accept an FL checklist item but the acceptance interface that is not enabled, data representative of the user input made through a non-enabled acceptance interface may be received by the CG processor 140, where such CG processor 140 may generate alert data and provide such alert data to the visual display unit, whereby the user presented with visual alert informing the user that the checklist item is not in a state for completion. In an embodiment in which an aural alert unit and/or a tactile alert unit is employed, the CG processor 140 may generate alert data if the data representative of the user input is made through a non-enabled acceptance interface and provide such alert data to the aural alert unit and/or the tactile alert unit, as applicable, whereby the user may be presented with an aural and/or tactile alert informing the user that the checklist item is not in a state for completion. Examples of aural alerts include sounds such as, but not limited to, tones and spoken text appropriate to the FL checklist item. Examples of tactile alerts include tactile stimulus integrated with other systems such as, but not limited to, the user interface 120 and/or the visual display unit 150, where the user interface 120 and/or screen of the visual display unit 150 may vibrate in response to the tactile alert.

The method continues with module 308 with the providing of the presentation data set to an visual display unit. Once received, the user may be presented with the dynamic vehicular checklist represented in the presentation data set, such that the acceptability information of one or more FL checklist items may be presented to the user. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting a dynamic checklist to a user of a vehicle, such system comprising:
   at least one vehicular source of internal system data;
   at least one interface for receiving user input data;
   a checklist generating processor configured to receive the internal system data representative of real-time internal system information of at least one first-level checklist item,
   generate a dynamic vehicular checklist comprised of
      a plurality of first collapsible and expandable dialog boxes,
      where each first collapsible and expandable dialog box is comprised of a first-level checklist item identifier,
      an automated alpha-numeric response applicable to the first-level checklist item identifier, and
      an expander interface, where at least one first collapsible and expandable dialog box is further comprised of an acceptance interface,
   determine a visual appearance of each automated alpha-numeric response as a function of the real-time internal system information and an acceptability configuration of the first-level checklist item,
where the acceptability configuration is a configuration of the first-level checklist item that has been defined as being acceptable, and
the visual appearance of each automated alpha-numeric response indicates an acceptability of the first-level checklist item,
receive first user input data representative of a selection of an expander interface,
where in response to the first user input data,
the collapsed dialog box changes to an expanded dialog box, or
the expanded dialog box changes to a collapsed dialog box,
where the expanded dialog box visually presents the real-time internal system information of the defined acceptability configuration,
determine an enablement of the acceptance interface based upon a compliance with the defined acceptability configuration,
receive second user input data representative of
a selection of the enabled acceptance interface, and
the completion of the first-level checklist item,
generate a presentation data set representative of the dynamic vehicular checklist and
provide the presentation data set to a visual display unit; and
the visual display unit configured to receive the presentation data set, and
present the dynamic vehicular checklist represented in the presentation data set.

2. The system of claim 1, wherein
at least one automated alpha-numeric response is integrated with an acceptance interface, such that the determination of the visual appearance of each automated alpha-numeric response includes a determination of the visual appearance of the integrated automated alpha-numeric response or acceptance interface, and the determination of the enablement of the acceptance GUI includes a determination of the enablement of the integrated automated alpha-numeric response or acceptance interface.

3. The system of claim 1, wherein
at least one first-level checklist item identifier is integrated with an automated alpha-numeric response and an acceptance interface, such that the determination of the visual appearance of each automated alpha-numeric response includes a determination of the visual appearance of the integrated first-level checklist item identifier or automated alpha-numeric response or acceptance interface, and the determination of the enablement of the acceptance interface includes a determination of the enablement of the integrated first-level checklist item identifier or automated alpha-numeric response or acceptance interface.

4. The system of claim 1, wherein at least one acceptance interface is a graphical user interface.

5. The system of claim 1, wherein at least one expander interface is a graphical user interface.

6. The system of claim 1, further comprising:
at least one external source of external data, and
the checklist generating processor is further configured to
receive external data representative of externally-generated information corresponding to at least one first-level checklist item, where
the acceptability configuration includes the externally-generated information.

7. The system of claim 1, wherein
the dynamic vehicular checklist is further comprised of at least one second collapsible and expandable dialog box, where
each second collapsible and expandable dialog box is comprised of
a second-level checklist item identifier,
a non-automated alpha-numeric response applicable to the second-level checklist item identifier, and
an expander interface, where
at least one second collapsible and expandable dialog box is further comprised of an acceptance interface.

8. The system of claim 1, wherein
the checklist generating processor is further configured to
generate alert data when a selection represented in the second user input data is made through a non-enabled acceptance interface, and
provide the alert data to the visual display unit, whereby a visual alert is presented to the user.

9. The system of claim 1, further comprising:
at least one alerting unit, where
each alerting unit is comprised of an aural alert unit or a tactile alert unit, and the checklist generating processor is further configured to
generate alert data when a selection represented in the second user input data is made through a non-enabled acceptance interface, and
provide the alert data to each alerting unit, whereby an aural alert is presented to the user when the alerting unit is comprised of an aural alert unit, or
a tactile alert is presented to the user where the alerting unit is comprised of an tactile alert unit.

10. A method for presenting a dynamic checklist to a user of a vehicle, such method comprising:
receiving internal system data representative of real-time internal system information of at least one first-level checklist item;
generating a dynamic vehicular checklist comprised of a plurality of first collapsible and expandable dialog boxes, where
each first collapsible and expandable dialog box is comprised of
a first-level checklist item identifier,
an automated alpha-numeric response applicable to the first-level checklist item identifier, and
an expander interface, where
at least one first collapsible and expandable dialog box is further comprised of an acceptance interface;
determining a visual appearance of each automated alpha-numeric response as a function of the real-time internal system information and an acceptability configuration of the first-level checklist item, where
the acceptability configuration is a configuration of the first-level checklist item that has been defined as being acceptable, and
the visual appearance of each automated alpha-numeric response indicates an acceptability of the first-level checklist item;
receiving first user input data representative of a selection of the expander interface, where in
response to the first user input data,
the collapsed dialog box changes to the expanded dialog box, or the expanded dialog box changes to the collapsed dialog box, where the expanded dialog box visually presents the real-time internal system information of the defined acceptability configuration;

determining an enablement of the acceptance interface based upon a compliance with the defined acceptability configuration;

receiving second user input data representative of a selection of an enabled acceptance interface, and the completion of the first-level checklist item;

generating a presentation data set representative of the dynamic vehicular checklist and providing the presentation data set to a visual display unit, whereby the dynamic vehicular checklist represented in the presentation data set is presented.

11. The method of claim 10, wherein at least one automated alpha-numeric response is integrated with an acceptance interface, such that the determination of the visual appearance of each automated alpha-numeric response includes a determination of the visual appearance of the integrated automated alpha-numeric response or acceptance interface, and the determination of the enablement of the acceptance GUI includes a determination of the enablement of the integrated automated alpha-numeric response or acceptance interface.

12. The method of claim 10, wherein at least one first-level checklist item identifier is integrated with an automated alpha-numeric response and an acceptance interface, such that the determination of the visual appearance of each automated alpha-numeric response includes a determination of the visual appearance of the integrated first-level checklist item identifier or automated alpha-numeric response or acceptance interface, and the determination of the enablement of the acceptance interface includes a determination of the enablement of the integrated first-level checklist item identifier or automated alpha-numeric response or acceptance interface.

13. The method of claim 10, wherein at least one acceptance interface is a graphical user interface.

14. The method of claim 10, wherein at least one expander interface is a graphical user interface.

15. The method of claim 10, further comprising:

receiving external data representative of externally-generated information corresponding to at least one first-level checklist item, where the acceptability configuration includes the externally-generated information.

16. The method of claim 10, wherein the dynamic vehicular checklist is further comprised of at least one second collapsible and expandable dialog box, where each second collapsible and expandable dialog box is comprised of a second-level checklist item identifier, a non-automated alpha-numeric response applicable to the second-level checklist item identifier, and an expander interface, where at least one second collapsible and expandable dialog box is further comprised of an acceptance interface.

17. The method of claim 10, further comprising:

generating alert data when a selection represented in the second user input data is made through a non-enabled acceptance interface; and providing the alert data to the visual display unit, whereby a visual alert is presented to the user.

18. The method of claim 10, further comprising:

generating alert data when a selection represented in the second user input data is made through a non-enabled acceptance interface; and providing the alert data to at least one alerting unit, whereby an aural alert is presented to the user when the alerting unit is comprised of an aural alert unit, or a tactile alert is presented to the user where the alerting unit is comprised of a tactile alert unit.

* * * * *